(12) United States Patent
Chang et al.

(10) Patent No.: US 7,239,365 B2
(45) Date of Patent: Jul. 3, 2007

(54) TRANSFLECTIVE LIQUID CRYSTAL DISPLAY

(75) Inventors: Wei-Chih Chang, Miaoli Hsien (TW); Li-Sen Chuang, Penghu Hsien (TW)

(73) Assignee: TPO Displays Corp., Chu-Nan (TW)

( * ) Notice: Subject to any disclaimer, the term of this patent is extended or adjusted under 35 U.S.C. 154(b) by 240 days.

(21) Appl. No.: 10/985,250

(22) Filed: Nov. 9, 2004

(65) Prior Publication Data

US 2006/0098144 A1    May 11, 2006

(51) Int. Cl.
*G02F 1/1335* (2006.01)
*G02F 1/1343* (2006.01)

(52) U.S. Cl. ..................... 349/114; 349/141
(58) Field of Classification Search ............. 349/114, 349/141
See application file for complete search history.

(56) References Cited

U.S. PATENT DOCUMENTS

| | | | |
|---|---|---|---|
| 6,999,144 B2* | 2/2006 | Wu et al. | 349/114 |
| 2003/0038909 A1* | 2/2003 | Ikeno et al. | 349/113 |
| 2003/0202139 A1 | 10/2003 | Choi et al. | |
| 2004/0090576 A1 | 5/2004 | Chuang | |
| 2004/0201804 A1* | 10/2004 | Ting et al. | 349/114 |
| 2005/0018114 A1* | 1/2005 | Park et al. | 349/114 |
| 2006/0023145 A1* | 2/2006 | Ting et al. | 349/114 |

* cited by examiner

*Primary Examiner*—Huyen Ngo
(74) *Attorney, Agent, or Firm*—Liu & Liu (57) ABSTRACT

An array substrate for a transflective liquid crystal display device is disclosed. The array substrate includes a substrate; a plurality of scanning lines and data lines on the substrate, crossing each other to define a plurality of pixel regions; a transmissive electrode disposed in the transmission region; and a reflector disposed in the reflection region and not subjected to a voltage. A lateral field is generated in the reflection region. The transflective LCD of the present invention achieves the maximum light efficiency in both reflection and transmission modes.

19 Claims, 8 Drawing Sheets

TRANSFLECTIVE LIQUID CRYSTAL DISPLAY

BACKGROUND OF THE INVENTION

1. Field of the Invention

The present invention relates to transflective liquid crystal displays, and more particularly to single cell gap type transflective liquid crystal displays.

2. Description of the Prior Art

Liquid crystal display (LCD) types are divided into three kinds: a transmissive LCD, a reflective LCD, and a transflective LCD. However, the transmissive LCD is a non-effective light converter that merely transmits about 3% to 8% of light from the backlight. Therefore, the transmissive LCD requires a backlight device having high brightness, leading to high power consumption. The reflective LCD uses ambient light for imaging, thus saving power consumption. However, the reflective LCD can be used during the day or in environments where external light exists, but not during the night or under poor ambient lighting.

Figure 1A:
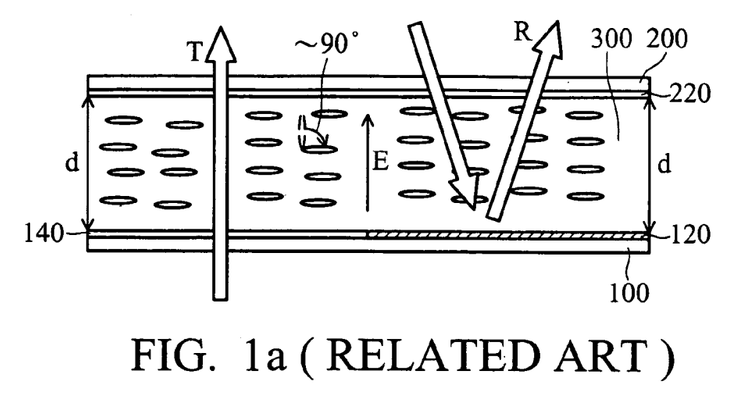
FIG. 1a is a cross-section of a conventional transflective liquid crystal display using a single cell gap.
Figure 1B:
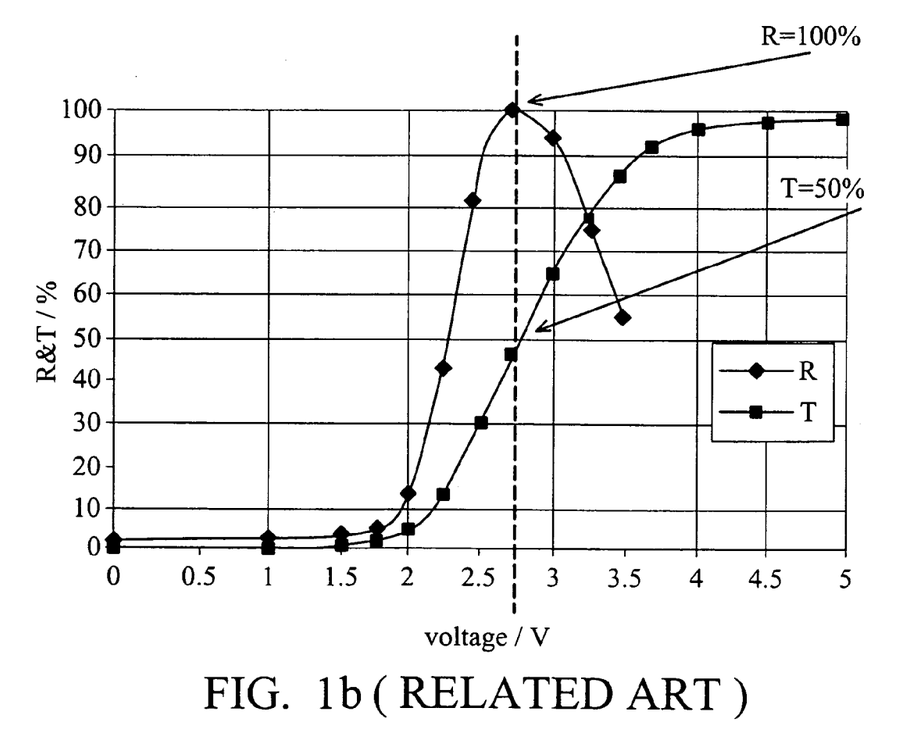

Therefore, the transflective LCD has been introduced. In general, two main approaches of transflective LCD have been developed: single cell gap (FIG. 1a) and double cell gap (FIG. 1b). FIG. 1a is a cross-section of a conventional transflective liquid crystal display using a single cell gap. The transflective LCD includes upper and lower substrates 200 and 100 opposing each other, and a liquid crystal layer 300 interposed between the upper and lower substrates. A common electrode 220 is formed below the upper substrate 200, a transmissive electrode 140 is formed in the transmission region T, and a reflective electrode 120 is formed in the reflection region R. The cell gap (d) in T and R regions is the same.

Light efficiency is proportional to the total retardation change experienced by the incident light traveling in the liquid crystal layer of the device. The total retardation change is a product of 1) birefringence change, $\Delta n$, 'seen' by the incident light as a result of the reorientation of the liquid crystal molecules upon an applied voltage and 2) total path length traveled by the incident light in the liquid crystal layer.

Since the light passes the LC layer 300 twice in the R region, but only once in the T region, the reflected light R experiences a total retardation change of $(\Delta n) \times (2d)$, twice that of T which is $(\Delta n) \times d$. FIG. 1b shows that R reaches 100% brightness at 2.75V whereas T only reaches 50% at the same voltage.

Figure 2A:
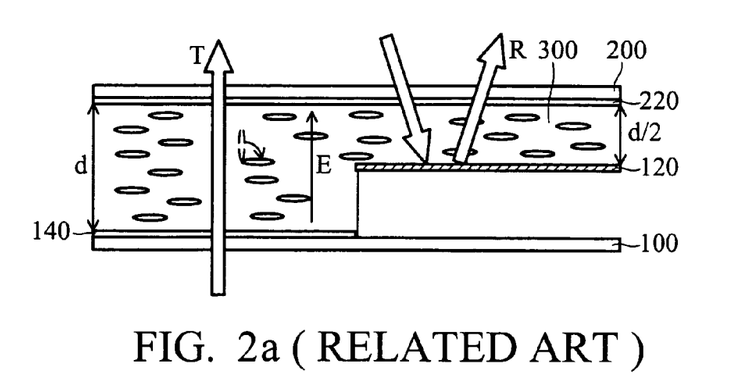
FIG. 2a is a cross-section of a conventional transflective liquid crystal display using a double cell gap.
Figure 2B:
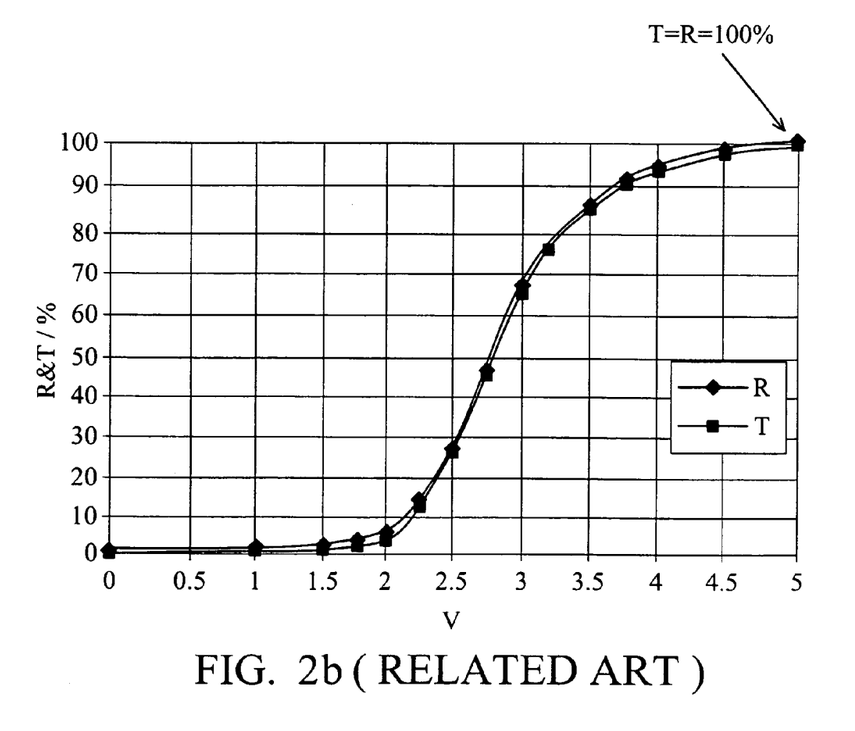

In order to achieve high light efficiency for both R and T modes, the double cell gap approach is often used such that the cell gap in the R region is reduced to d/2, so that the total length traveled by light in the LC layer 300 for T and R regions is the same (FIG. 2a). The total retardation change in the R region, which is $(\Delta n) \times 2 \times (d/2)$, is thus equal to that in the T region $((\Delta n) \times d)$. Thus, both R and T can have equally high efficiency of 100% as shown in FIG. 2b. This approach, however, leads to much more complicated structure. The fabrication process needs to maintain good control over the difference between the two cell gaps, which depends on the control of the extra layer (usually an organic layer). Moreover, this difference in cell gap between R and T regions also leads to different response times between R and T modes.

U.S. Patent Publication US2003/0202139A1 discloses a transflective liquid crystal display that requires only a single cell gap. The disclosure in this publication is rather unclear. The abstract of this publication states that instead of reducing the cell gap of the reflective region, it reduces the birefringence change $\Delta n$ of reflective pixels so that the total retardation change $\Delta nd$ of the reflective region is equal to that of the transmissive pixels. This is realized by a partial switching of the pixels of approximately 45 degrees which occurs in the reflective pixel region of the single cell gap by applying fringing fields, generated by a discontinuous electrode, to the molecules in the reflective pixel region of the cell gap. It appears that the entire reflective region is provided with a discontinuous electrode in the structure disclosed in this publication. It is unclear how commercially viable would be the disclosed structure.

SUMMARY OF THE INVENTION

The present invention is to solve the above-mentioned problem and provide an array substrate for a transflective liquid crystal display device. The array substrate of the present invention can produce a single cell gap transflective liquid crystal display device having substantially equal light efficiency for both reflection and transmission regions.

In one aspect, the present invention discloses a transflective LCD display panel, comprising a pixel array structure in which the transmission region is provided with a transmissive electrode, and the reflective region is provided with a reflective layer that is not subject to a electrical potential (i.e., not function as pixel electrode). In one embodiment, the array substrate of the present invention comprises a substrate; a plurality of scanning lines and data lines on the substrate, crossing each other to define a plurality of pixel regions, the pixel region having a transmission region and a reflective region; a transmissive electrode disposed in the transmission region; and a reflector disposed in the reflection region, not subjected to a voltage.

The transflective liquid crystal display panel of the present invention comprises the array substrate mentioned above, an opposing substrate spaced apart from the array substrate and having a common electrode, and a liquid crystal layer interposed between the transmissive electrode and the common electrode.

BRIEF DESCRIPTION OF THE DRAWINGS

The present invention will become more fully understood from the detailed description given hereinbelow and the accompanying drawings, given by way of illustration only and thus not intended to be limitative of the present invention.

FIG. 1b shows reflection ratio vs. voltage plot and transmission ratio vs. voltage plot of the device of FIG. 1a.

FIG. 2b shows reflection ratio vs. voltage plot and transmission ratio vs. voltage plot of the device of FIG. 2a.

DETAILED DESCRIPTION OF THE INVENTION

Figure 3:
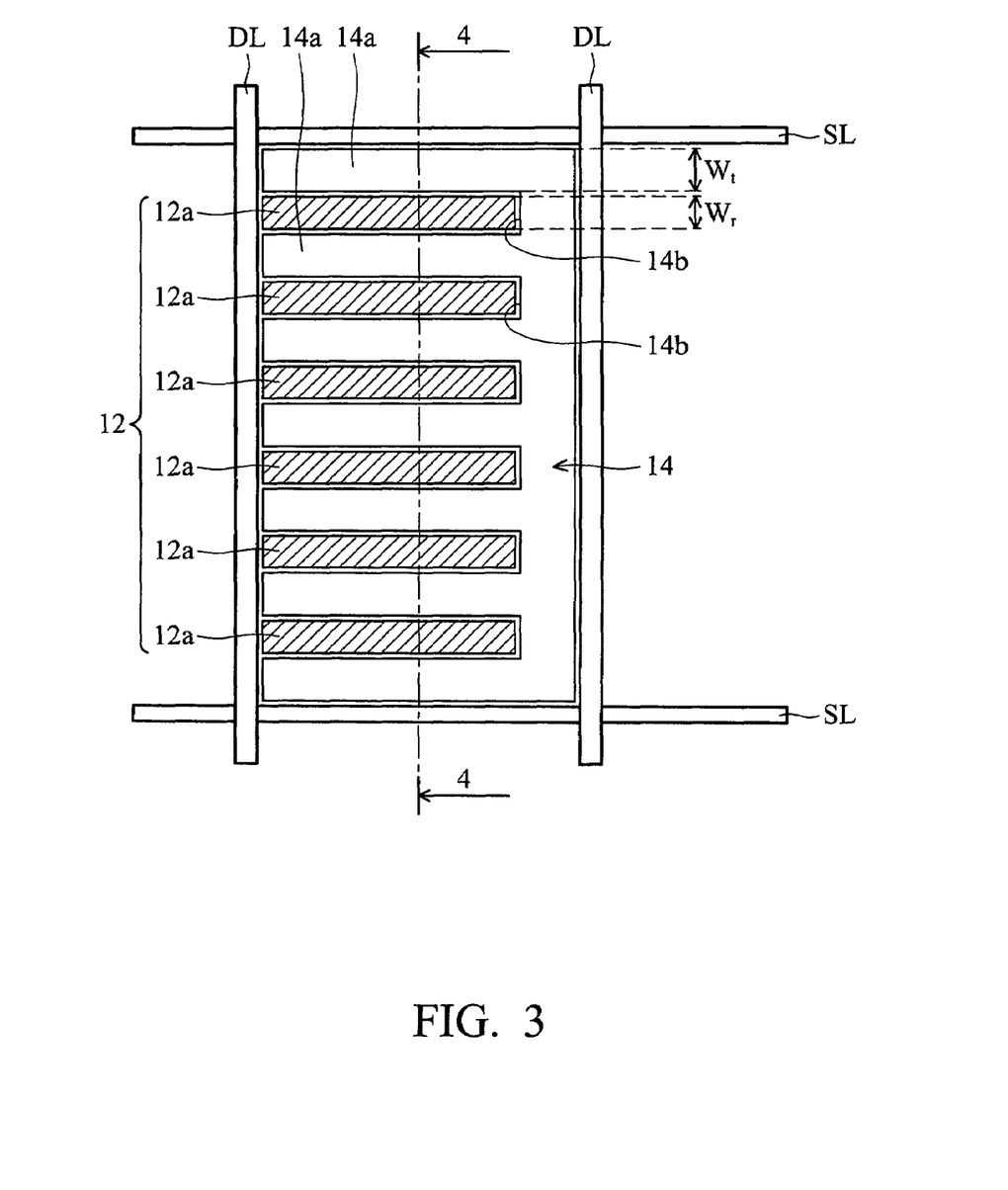
FIG. 3 is a plan view of a pixel of a transflective liquid crystal display panel according to a first embodiment of the present invention.
Figure 4A:
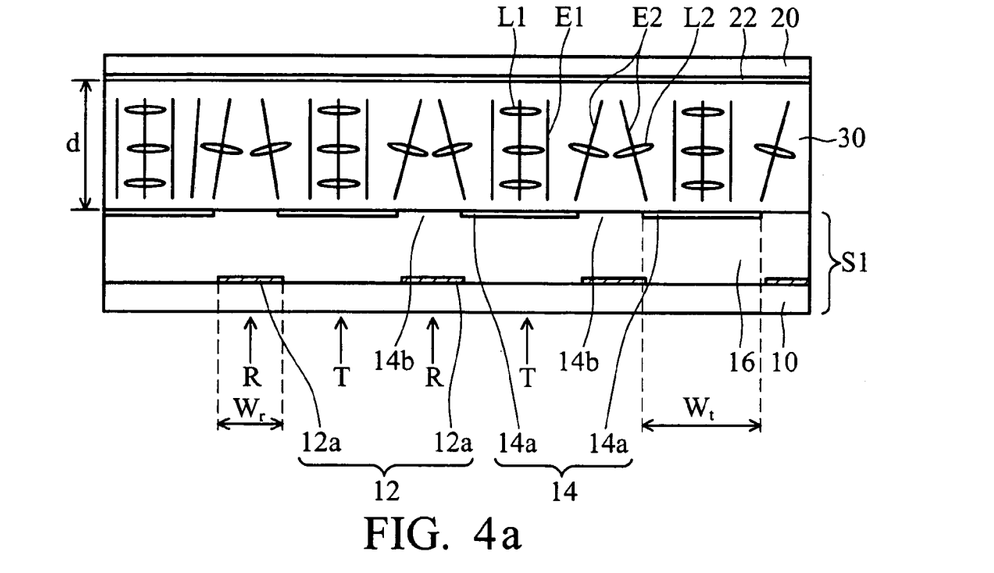
FIG. 4a is a cross-section taken along line 4-4 of FIG. 3.

FIG. 3 is a plan view of a pixel of a transflective liquid crystal display panel according to a first embodiment of the present invention. FIG. 4a is a cross-section taken along line 4-4 of FIG. 3. Referring to FIGS. 3 and 4a, the transflective LCD panel includes an array substrate S1 and an opposing substrate 20 spaced apart from the array substrate S1. The array substrate S1 includes a substrate 10, a plurality of scanning lines (SL, gate lines), a plurality of data lines (DL), a reflector 12, a transmissive electrode 14, and a planarization layer 16 formed between the reflector 12 and the transmissive electrode 14. The opposing substrate 20 has a common electrode 22 below it. A liquid crystal layer 30 is interposed between the transmissive electrode 14 and the common electrode 22.

Scanning lines (SL) extend along an X axis, data lines (DL) extend along a Y axis, and they cross each other to define a plurality of pixel regions. The pixel region includes a transmission region T and a reflection region R.

The transmissive electrode 14 is disposed on the substrate 10 in the transmission region T. Referring to FIGS. 3 and 4a, the transmissive electrode 14 can be comb-shaped and include a plurality of slits 14b in the reflection region R, thus dividing the transmissive electrode 14 into a plurality of discontinuous transmissive electrode portions 14a. The reflector 12 is disposed on the substrate 10 in the reflection region R and is not subjected to a voltage. The reflector 12 includes a plurality of reflector portions 12a in corresponding locations of the slits 14b. The transmissive electrode portions 14a and the reflector portions 12a are alternatively disposed.

Referring to FIG. 4a, the feature of the present invention resides in that the reflector 12 is not an electrode, that is, is not subjected to a voltage. On the other hand, the transmissive electrode 14 is subjected to a voltage. Negative type liquid crystal aligns vertically to an electric field when voltage is on, and is used as an example in this embodiment.

In this embodiment, negative type liquid crystal is used, the transmissive electrode 14 is subjected to a voltage, but the reflector 12 is not subjected to a voltage (i.e., not function as pixel electrode). Thus, a vertical electric field E1 is generated by the plane of the transmissive electrode 14 in an angle about 90 degree, while a lateral field (fringing field) E2 is generated by the edge of the transmissive electrode 14 in a tilt angle less than 90 degree. Thus, as applying voltage, liquid crystal molecules L1 in the transmission region T are governed by E1 and ice a homogenous orientation, while liquid crystal molecules L2 in the reflection region R are governed by E2 and in a tilt angle. A lower tilt angle results in reduced effective birefringence change $\Delta n_{eff}$. Thus, the effective birefringence change $\Delta n_{Reff}$ of liquid crystal in the R region is reduced to less than effective birefringence change $\Delta n_{Teff}$ of liquid crystal in the T region.

The width of the transmissive electrode portions 14a, extending along the direction of data lines, shown as $W_t$ can be 1 to 10 μm. The width of the reflector portions 12a, extending along the direction of data lines, shown as $W_r$ can be 1 to 10 μm. In a preferred condition, $W_t$, $W_r$, and the cell gap d can be optimally adjusted to achieve the birefringence change in the R region is reduced to $\Delta n/2$. Thus, the total retardation change in the R region, $(\Delta n/2) \times 2 \times d$, becomes equal to that in the T region, $\Delta n \times d$. As a result, the light efficiency in both R and T regions becomes substantially equal.

In addition, a compensator (not shown) and a polarizer (not shown) can be formed on the outer surfaces of both the upper substrate 20 and the lower substrate 10 respectively. The compensator can be a λ/4 film.

Figure 4B:
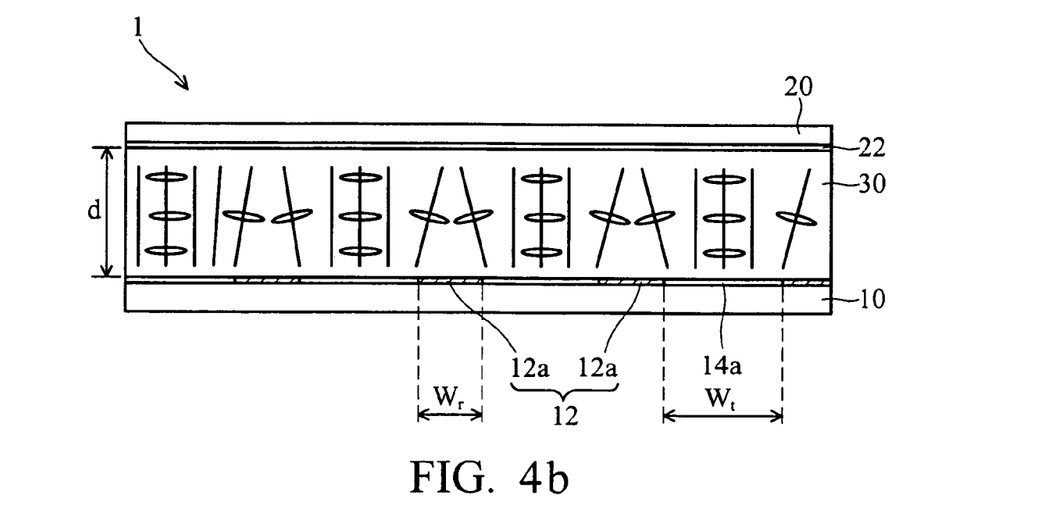
FIG. 4b is another cross-section taken along line 4-4 of FIG. 3.

FIG. 4b shows a transflective LCD panel 1, another cross-section taken along line 4-4 of FIG. 3. FIG. 4b differs from FIG. 4a in that the LCD panel of FIG. 4b does not include a planarization layer 16, and the transmissive electrode 14 and the reflector 12 are interlaced. The reflector 12 can be a non-conductive and high reflectance material, for example, multi-layer dielectric film when the transmissive electrode 14 has connection with the reflector 12. Also, the reflector 12 can be a conductive and high reflectance material, for example, Al, Ag or Al alloy when the transmissive electrode 14 is isolated from the reflector 12 via a distance or isolation film (not shown), so that the reflector 12 is not subjected to a voltage.

Figure 5:
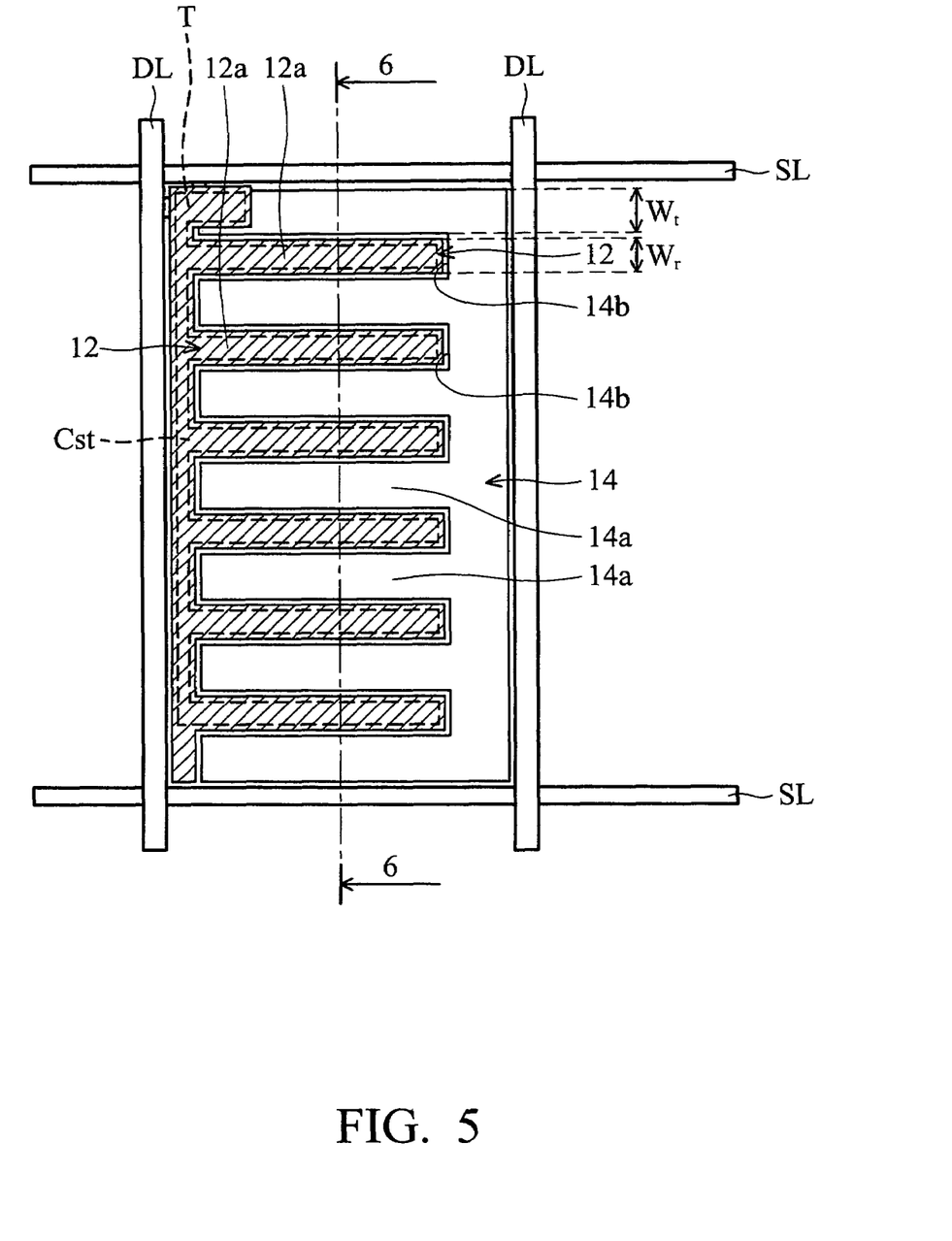
FIG. 5 is a plan view of a pixel of a transflective liquid crystal display panel according to a second embodiment of the present invention.
Figure 6A:
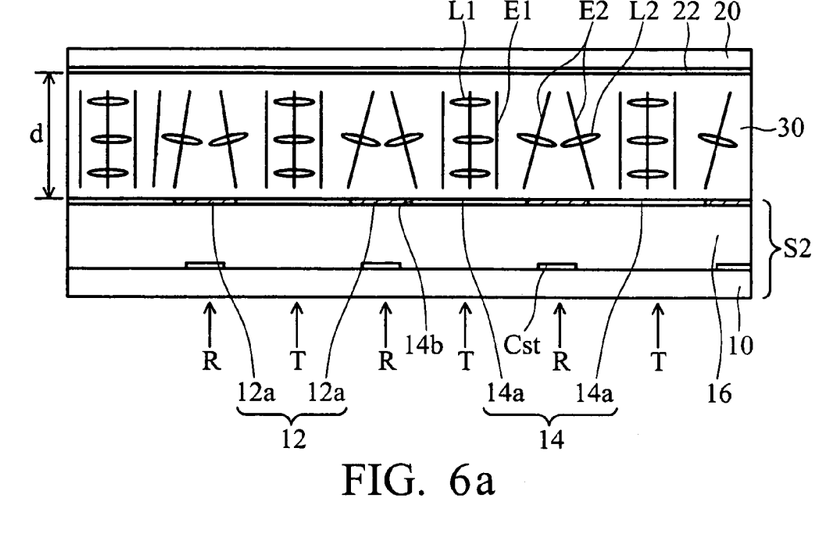
FIG. 6a is a cross-section taken along line 6-6 of FIG. 5.

FIG. 5 is a plan view of a pixel of a transflective liquid crystal display panel according to a second embodiment of the present invention. FIG. 6a is a cross-section taken along line 6-6 of FIG. 5. Referring to FIGS. 5 and 6a, the transflective LCD panel includes an array substrate S2 and an opposing substrate 20 spaced apart from the array substrate S2. The array substrate S2 includes a substrate 10, a plurality of scanning lines (SL, gate lines), a plurality of data lines (DL), a reflector 12, a transmissive electrode 14 located in the same level as the reflector 12, a storage capacitor Cst, and a planarization layer 16 formed between the reflector 12 and the storage capacitor Cst. The opposing substrate 20 has a common electrode 22 below it. A liquid crystal layer 30 is interposed between the transmissive electrode 14 and the common electrode 22.

Scanning lines (SL) extend along an X axis, data lines (DL) extend along a Y axis, and they cross each other to define a plurality of pixel regions. The pixel region includes a transmission region T and a reflective region R.

The transmissive electrode 14 is disposed on the substrate 10 in the transmission region T. Referring to FIGS. 5 and 6a, the transmissive electrode 14 can be comb-shaped and include a plurality of slits 14b in the reflection region R, thus dividing the transmissive electrode 14 into a plurality of discontinuous transmissive electrode portions 14a. The reflector 12 (the oblique line portion surrounded by the real line) is disposed on the substrate 10 in the reflection region R and is not subjected to a voltage. The reflector 12 includes a plurality of reflector portions 12a in corresponding locations of the slits 14b. The storage capacitor Cst and a switching device T (not shown, such as a TFT), occupying the oblique line portion surrounded by the dotted line, are disposed below the reflector 12.

Similar to descriptions in the first embodiment, referring to FIG. 6a, the feature of the present invention resides in that the reflector 12 does not function as pixel electrode, that is, is not subjected to a voltage. Thus, a vertical electric field E1 is generated in the transmission region T, while a lateral field (fringing field) E2 is generated in the reflection region R. Thus, liquid crystal molecules L1 in the transmission region T are switched from vertical alignment to homogenous alignment, while liquid crystal molecules L2 in the reflection region R are switched to align in a tilt angle less than 90°. The birefringence change in the R region can be thus reduced to less than that in the T region.

In a preferred condition, the width ($W_r$) of the reflector portions 12a, the width ($W_t$) of the transmissive electrode portions 14a, and the cell gap (d) can be optimally adjusted to achieve the birefringence change in the R region is reduced to $\Delta n/2$. Thus, the total retardation change in the R region, $(\Delta n/2) \times 2 \times d$, becomes equal to that in the T region, $\Delta n \times d$. As a result, the light efficiency in both R and T regions becomes substantially equal.

Figure 6B:
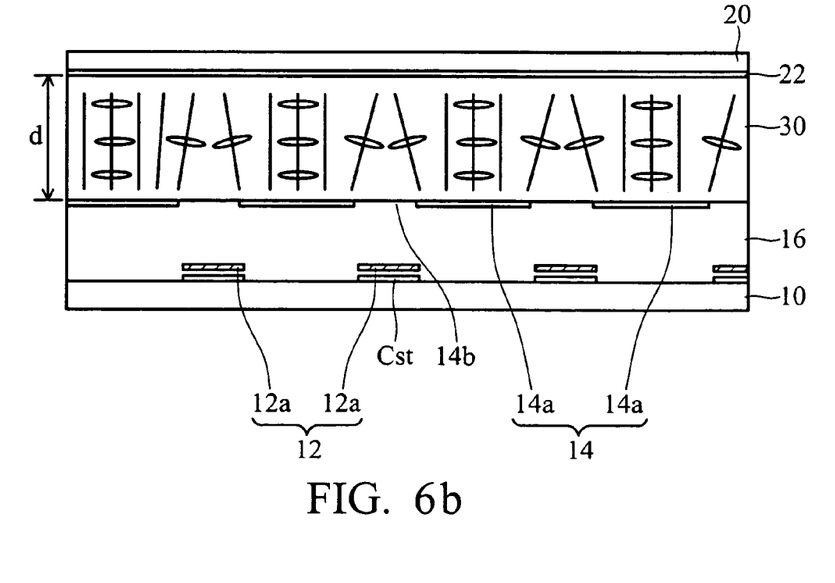
FIG. 6b is another cross-section taken along line 6-6 of FIG. 5.

FIG. 6b is another cross-section taken along line 6-6 of FIG. 5. FIG. 6b differs from FIG. 6a in the arrangement of the reflector 12. In FIG. 6a, the reflector 12 and the transmissive electrode 14 are located in the same level. In FIG. 6b, however, the reflector 12 is below the transmissive electrode 14, but the reflector portions 12a are still disposed in corresponding locations of slits 14b.

While the foregoing embodiments show capacitors Cst to be a separate element below the reflector portions 12a, the capacitors Cst may be the same element as the reflector portions 12a. For example, the capacitors Cst may be provided with a reflective surface, and a size that corresponds to the slit between adjacent transmissive electrodes.

Further, the size of the reflector portions 12a need not be exactly the same size as the slits between adjacent transmissive electrode.

Computer Simulation

The optical calculation is performed by liquid crystal MLC-6882, having $\Delta \epsilon = -4$ and $\Delta n = 0.0988$. The reflector 12 is aluminum, with width $W_r$ of the reflector portion 12a 4 μm. The transmissive electrode 14 is ITO (indium tin oxide), and the width $W_t$ of the transmissive electrode portions 14a is 4 μm. The cell gap is 4 μm.

Figure 7:
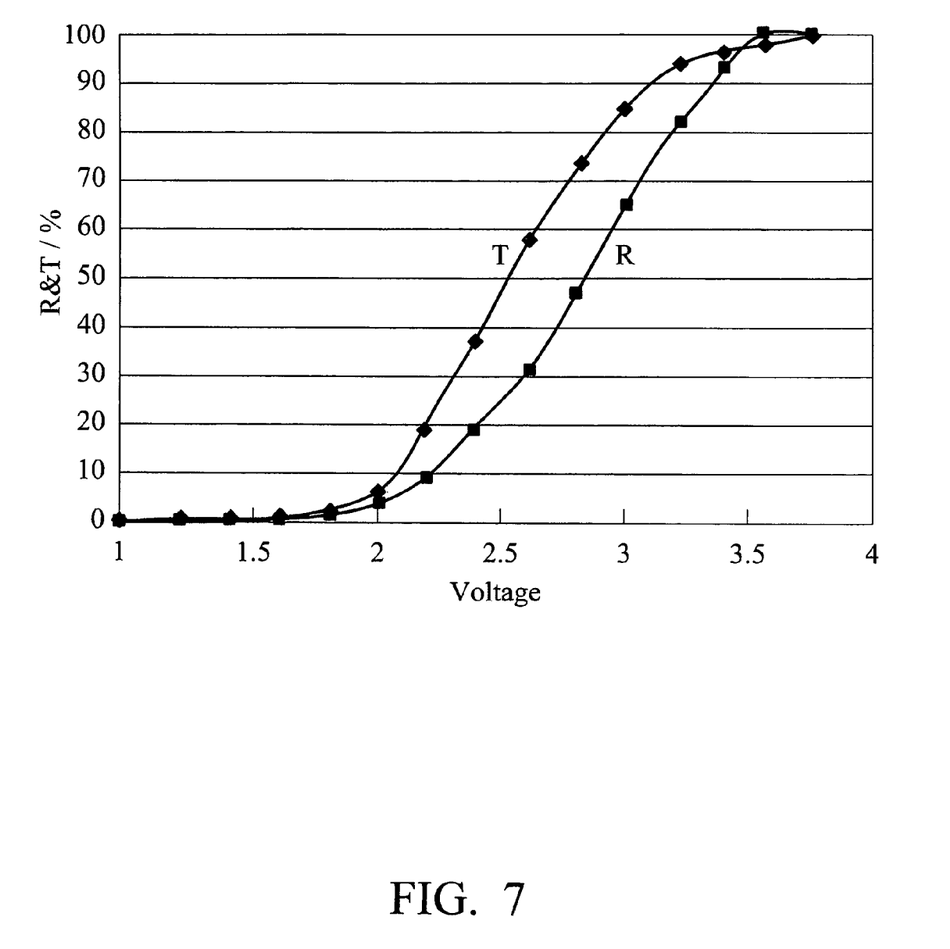
FIG. 7 shows reflection ratio vs. voltage plot and transmission ratio vs. voltage plot of the LCD panel of FIG. 4b.

FIG. 7 shows reflection ratio vs. voltage plot and transmission ratio vs. voltage plot of the LCD panel of FIG. 4b.

Figure 8:
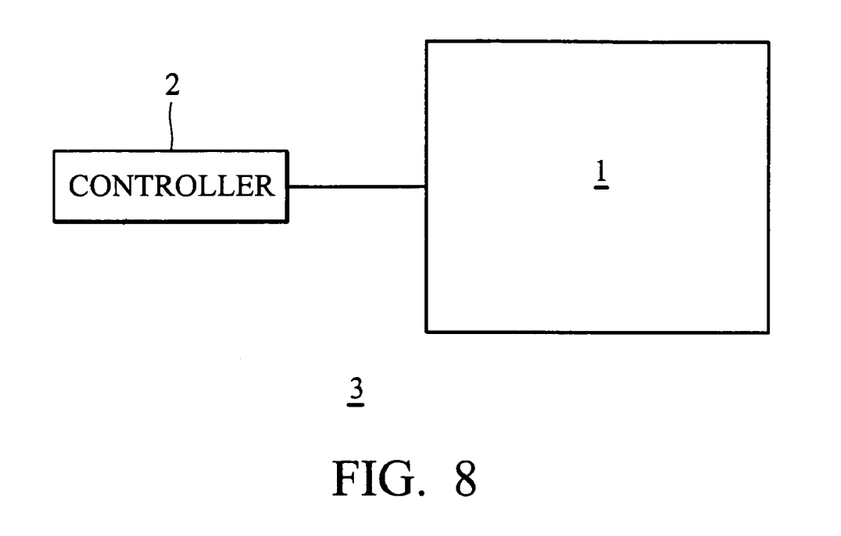
FIG. 8 is a schematic diagram of a transflective LCD device of the present invention.

FIG. 8 is a schematic diagram illustrating a LCD device incorporating the transflective LCD panel 1 of FIG. 4b of the present invention. The transflective LCD panel 1 as shown in FIG. 4b is coupled to a controller 2 to form a liquid crystal display device 3. The controller 2 can comprise a source and gate driving circuits (not shown) to control the LCD panel 1 to render image in accordance with an input.

Figure 9:
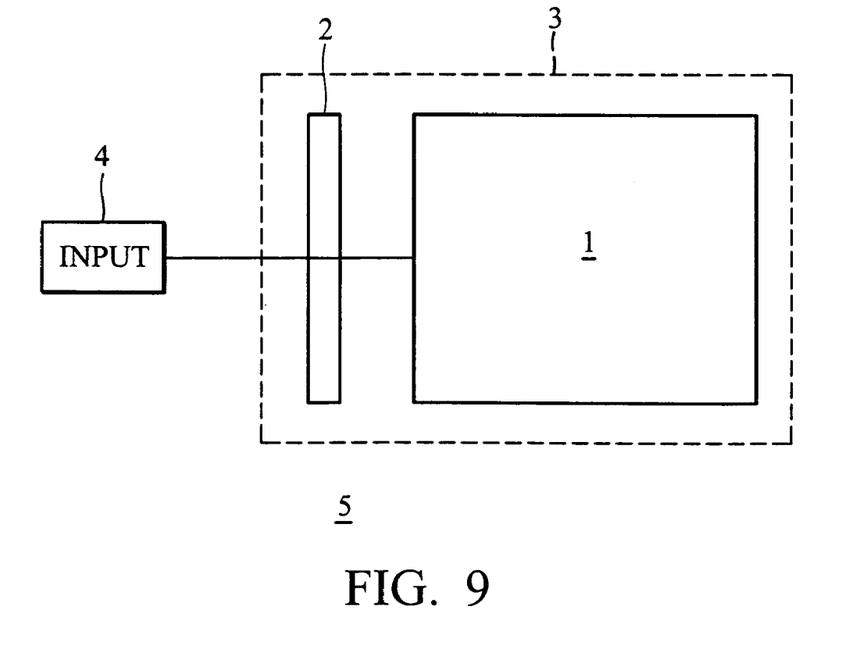
FIG. 9 is a schematic diagram of an electronic device of the present invention.

FIG. 9 is a schematic diagram illustrating an electronic device incorporating the LCD device 3 shown in FIG. 8. An input device 4 is coupled to the controller 2 of the LCD device 3 shown in FIG. 8 to form an electronic device 5. The input device 4 can include a processor or the like to input data to the controller 2 to render an image. The electronic device 5 may be a portable device such as a PDA (personal digital assistant), notebook computer, tablet computer, cellular phone, or a display monitor device, or non-portable device such as a desktop computer.

In conclusion, in the transflective liquid crystal display of the present invention, the reflector is not an electrode and a lateral field is generated in the reflection region. Thus, the effective birefringence change $\Delta n_{Reff}$ in the R region is reduced, and the total retardation change in the R region is reduced in turn. As a result, the light efficiency in the R region is reduced to approach, or even optimally reduced to substantially equal, that in the T region. Thus, the transflective LCD of the present invention achieves the maximum light efficiency in both reflection and transmission modes.

The foregoing description of the preferred embodiments of this invention has been presented for purposes of illustration and description. Obvious modifications or variations are possible in light of the above teaching. The embodiments chosen and described provide an excellent illustration of the principles of this invention and its practical application to thereby enable those skilled in the art to utilize the invention in various embodiments and with various modifications as are suited to the particular use contemplated. All such modifications and variations are within the scope of the present invention as determined by the appended claims when interpreted in accordance with the breadth to which they are fairly, legally, and equitably entitled.

What is claimed is:

1. An array substrate for a transflective liquid crystal display device, comprising:
   a substrate;
   a plurality of scanning lines and data lines on the substrate, defining a plurality of pixel regions, each pixel region having a transmission region and a reflection region;
   a transmissive electrode disposed in the transmission region; and
   a reflector disposed in the reflection region and not function as pixel electrode,
   wherein the transmissive electrode comprises a plurality of transmissive electrode portions each having a width of 1 to 10 μm, the reflector comprises a plurality of reflector portions, and the transmissive electrode portions and the reflector portions are alternatively disposed.

2. The array substrate as claimed in claim 1, wherein the transmissive electrode is comb-shaped and comprises a plurality of slits defining a plurality of extending transmissive electrode potions.

3. The array substrate as claimed in claim 2, wherein the reflector portions are disposed in corresponding locations of the slits.

4. The array substrate as claimed in claim 1, further comprising a planarization layer formed between the transmissive electrode and the reflector.

5. The array substrate as claimed in claim 1, wherein the transmissive electrode and the reflector are located in the same level.

6. The array substrate as claimed in claim 1, further comprising a storage capacitor disposed below the reflector.

7. A transflective liquid crystal display panel, comprising:
   the array substrate as claimed in claim 1;
   an opposing substrate spaced apart from the array substrate and having a common electrode; and
   a liquid crystal layer interposed between the transmissive electrode and the common electrode.

8. A transflective liquid crystal display device, comprising:
   the transflective liquid crystal display panel as claimed in claim 7; and
   a controller coupled to the transflective liquid crystal display panel to control the panel to render an image in accordance with an input.

9. An electronic device, comprising:
   the transflective liquid crystal display device as claimed in claim 8; and
   an input device coupled to the controller of the transflective liquid crystal display device to control the display device to render an image.

10. The transflective liquid crystal display panel as claimed in claim 7, having a single cell gap over the entire pixel region.

11. The transflective liquid crystal display panel as claimed in claim 10, wherein an electric field applied to the transmissive electrode creates a lateral field extending into the reflection region.

12. The transflective liquid crystal display panel as claimed in claim 11, wherein the effective birefringence change $\Delta n_{Reff}$ of liquid crystal in the reflection region is less than the effective birefringence change $\Delta n_{Teff}$ of liquid crystal in the transmission region upon application of the electric field to the transmissive electrode.

13. The transflective liquid crystal display panel as claimed in claim 12, wherein the transmission region and the reflection region have a substantially equal total retardation change.

14. An array substrate for a transflective liquid crystal display device, comprising:
   a substrate;
   a plurality of scanning lines and data on the substrate, defining a plurality of pixel regions, each pixel region having a transmission region and a reflection region;
   a transmissive electrode disposed in the transmission region; and
   a reflector disposed in the reflection region and not function as pixel electrode,
   wherein the transmissive electrode comprises a plurality of transmissive electrode portions, the reflector comprises a plurality of reflector portions each having a width of 1 to 10 μm, and the transmissive electrode portions and the reflector portions are alternatively disposed.

15. The array substrate as claimed in claim 14, wherein the transmissive electrode is comb-shaped and comprises a plurality of slits defining a plurality of extending transmissive electrode portions.

16. The array substrate as claimed in claim 15, wherein the reflector portions are disposed in corresponding locations of the slits.

17. The array substrate as claimed in claim 14, further comprising a planarization layer formed between the transmissive electrode and the reflector.

18. The array substrate as claimed in claim 14, wherein the transmissive electrode and the reflector are located in the same level.

19. The array substrate as clained in claim 14, further comprising a storage capacitor disposed below the reflector.

* * * * *